United States Patent Office 3,249,604
Patented May 3, 1966

---

3,249,604
3-ALKOXYPHENYL-2H-1,4-BENZOXAZIN-2-ONES
Robert B. Moffett, Kalamazoo, Mich., assignor to The Upjohn Company, Kalamazoo, Mich., a corporation of Delaware
No Drawing. Filed Nov. 20, 1963, Ser. No. 325,168
5 Claims. (Cl. 260—244)

This invention relates to new chemical compounds and to a process for preparing the same and is particularly directed to novel 3-alkoxyphenyl-2H-1,4-benzoxazin-2-ones and the preparation thereof.

The novel compounds of the invention have the following structural formula

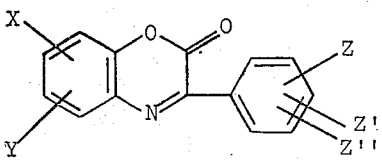

wherein X and Y are members selected from the group consisting of hydrogen, nitro, hydroxy, and halogen; Z is a member selected from the group consisting of lower-alkoxy wherein the alkyl moiety is from 1 to 4 carbon atoms, inclusive; Z' and Z" are members selected from the group consisting of hydrogen and lower-alkoxy wherein the alkyl moiety is from 1 to 4 carbon atoms, inclusive.

The novel compounds of the present invention are prepared by condensing an o-aminophenol with a lower-alkyl ester of alkoxyphenylglyoxylic acid according to the following equation

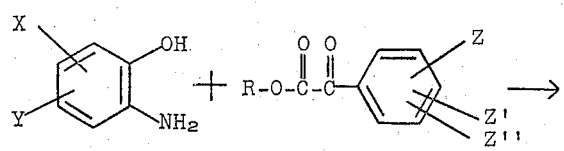

wherein R is lower-alkyl of from 1 to 8 carbon atoms, inclusive, and X, Y, Z, Z' and Z" are as defined above.

As used in the present specification and claims the term lower-alkyl is used to mean an alkyl group of from 1 to 8 carbons, inclusive, for example, methyl, ethyl, propyl, butyl, amyl, hexyl, heptyl, and octyl and the isomeric forms thereof. The term lower-alkoxy is used to mean an alkoxy group wherein the alkyl moiety is from 1 to 4 carbon atoms, inclusive, for example, methoxy, ethoxy, propoxy, butoxy and the isomeric forms thereof.

The condensation is accelerated by gentle heating (from room temperature, about 25° C., to about 180° C., the optimum temperature depending upon the nature of the particular reactants) and advantageously is carried out in a non-oxidizing atmosphere, for example, nitrogen. The proportions of reactants can be varied over a wide range. Equimolar amounts are suitable though sometimes it is desirable to use an excess of one or the other reactant, say up to about 100% excess. An inert solvent, for example, toluene, ethanol, dioxane, or tetrahydrofuran can be used if desired.

The novel compounds of the Formula I have sedative and tranquilizing activity and can be used to calm agitated mammals or animals, e.g., laboratory rats and mice. The compounds of the Formula I also have shown antibacterial activity, e.g., inhibit the growth of *M. phlei*; and antiviral activity, e.g., inhibit the growth of Newcastle disease virus in chick embryo cells. Further, the compounds depress lipid metabolism and can be used as anti-obesity agents.

The invention can be more fully understood by reference to the following examples which are given by way of illustration and not of limitation. Parts and percentages are by weight unless otherwise specified.

EXAMPLE 1

*7,8-dihydroxy-3-(3,4-dimethoxyphenyl)-2H-1,4-benzoxazin-2-one*

A solution of 0.06 mole of 4-aminopyrogallol in 100 ml. of ethanol was prepared by hydrogenation of 10.27 gm. (0.06 mole) of 4-nitropyrogallol. To the ethanolic 4-aminopyrogallol solution was added to a solution of 14.3 gm. (0.06 mole) of ethyl 3,4-dimethoxyphenylglyoxylate in 100 ml. of ethanol. The solution turned dark red and after standing at room temperature overnight under nitrogen was evaporated in vacuo below 40° C. to a dark oil which soon solidified. The solid was heated in 100 ml. of methanol to the boiling point, cooled, and filtered. The solid precipitate was washed with methanol and dried to provide 11.6 gm. of yellow brown solid having a melting point of 236–239.5° C. (dec.). The yellow brown solid was dissolved in 800 ml. of acetone, the solution filtered and concentrated to about 250 ml. After cooling a solid formed which was collected on a filter, washed with acetone and dried to provide 8.2 gm. of yellow brown crystals of 7,8-dihydroxy-3-(3,4-dimethoxyphenyl)-2H-1,4-benzoxazin-2-one having a melting point of 240–241° C. (dec.).

An additional 1.8 gm. of 7,8-dihydroxy-3-(3,4-dimethoxyphenyl)-2H-1,4-benzoxazin-2-one was obtained from the filtrates; M.P. 238–239° C. (dec.).

*Analysis.*—Calcd. for $C_{16}H_{13}NO_6$; C, 60.95; H, 4.16; N, 4.44; O, 30.45. Found: C, 61.04; H, 3.85; N, 4.53; O, 30.05.

Following the foregoing procedure, substituting for the 4-aminopyrogallol an equimolar amount each of 2-amino-4-bromophenol,
2-amino-3,5-dibromophenol,
2-amino-6-nitrophenol,
2-amino-4-chloro-5-nitrophenol,
2-amino-4-chloro-6-nitrophenol,
2-amino-4-nitro-6-bromophenol,
2-amino-4-bromo-6-nitrophenol,
2-amino-4,6-dinitrophenol,
2-amino-4,6-dibromo-5-hydroxyphenol, and
2-amino-4-fluorophenol, there can be obtained, respectively, 6-bromo-3-(3,4-dimethoxyphenol)-2H-1,4-benzoxazin-2-one,
5,7-dibromo-3-(3,4-dimethoxyphenyl)-2H-1,4-benzoxazin-2-one,
8-nitro-3-(3,4-dimethoxyphenyl)-2H-1,4-benzoxazin-2-one,
6-chloro-7-nitro-3-(3,4-dimethoxyphenyl)-2H-1,4-benzoxazin-2-one,
6-chloro-8-nitro-3-(3,4-dimethoxyphenyl)-2H-1,4-benzoxazin-2-one,
6-nitro-8-bromo-3-(3,4-dimethoxyphenyl)-2H-1,4-benzoxazin-2-one,
6-bromo-8-nitro-3-(3,4-dimethoxyphenyl)-2H-1,4-benzoxazin-2-one,
6,8-dinitro-3-(3,4-dimethoxyphenyl)-2H-1,4-benzoxazin-2-one,
6,8-dibromo-7-hydroxy-3-(3,4-dimethoxyphenyl)-2H-1,4-benzoxazin-2-one, and
6-fluoro-3-(3,4-dimethoxyphenyl)-2H-1,4-benzoxazin-2-one.

EXAMPLE 2

*3-(3,4-dimethoxyphenyl)-2H-1,4-benzoxazin-2-one*

A mixture of 8.7 gm. (0.08 mole) of o-aminophenol and 14.3 gm. (0.06 mole) of ethyl 3,4-dimethoxyphenylglyoxylate was heated and melted with stirring under nitrogen in an oil bath at 150° C. for 1 hour. The mixture after melting soon set solid. After cooling the solid was dissolved in 80 ml. of hot dimethylformamide, filtered and the filtrate diluted with an equal volume of absolute ethanol. Upon dilution crystals formed which were collected on a filter, washed with ethanol and dried to provide 16.1 gm. (94.5% yield) of fluffy yellow needles of 3-(3,4-dimethoxyphenyl)-2H-1,4-benzoxazin-2-one having a melting point of 160.5–161.5° C. (dec.).

*Analysis.*—Calcd. for $C_{16}H_{13}NO_4$: C, 67.84; H, 4.62; N, 4.95. Found: C, 67.45; H, 4.55; N, 4.82.

Following the foregoing procedure, substituting for the ethyl 3,4-dimethoxyphenylglyoxylate an equimolar amount each of ethyl 3,4-diethoxyphenylglyoxylate,
ethyl 3,4-diisopropoxyphenylglyoxylate,
ethyl 3,4-dibutoxyphenylglyoxylate,
ethyl 3-methoxyphenylglyoxylate,
ethyl 3-ethoxyphenylglyoxylate,
ethyl 3-propoxyphenylglyoxylate,
ethyl 3-butoxyphenylglyoxylate, and
ethyl 3,4,5-trimethoxyphenylglyoxylate, there can be obtained, respectively, 3-(3,4-diethoxyphenyl)-2H-1,4-benzoxazin-2-one,
3-(3,4-diisopropoxyphenyl)-2H-1,4-benzoxazin-2-one,
3-(3,4-dibutoxyphenyl)-2H-1,4-benzoxazin-2-one,
3-(3-methoxyphenyl)-2H-1,4-benzoxazin-2-one,
3-(3-ethoxyphenyl)-2H-1,4-benzoxazin-2-one,
3-(3-propoxyphenyl)-2H-1,4-benzoxazin-2-one,
3-(3-butoxyphenyl)-2H-1,4-benzoxazin-2-one, and
3-(3,4,5-trimethoxyphenyl)-2H-1,4-benzoxazin-2-one.

EXAMPLE 3

*3-(3,4-dimethoxyphenyl)-7-nitro-2H-1,4-benzoxazin-2-one*

A solution of 12.3 gm. (0.08 mole) of 2-amino-5-nitrophenol and 14.3 gm. (0.06 mole) of ethyl 3,4-dimethoxyphenylglyoxylate in 100 ml. of absolute ethanol was heated under reflux with stirring for 0.5 hour and then the solvent was allowed to distill from the system at 150° C. during 1.5 hours. On cooling the residue crystallized and was boiled with 150 ml. of ethanol. After cooling the solid was collected on a filter and washed with ethanol to provide 11.2 gm. (57% yield) of brown crystals of 3-(3,4-dimethoxyphenyl)-7-nitro-2H-1,4-benzoxazin-2-one having a melting point of 199–202° C. The brown crystals were recrystallized from 230 ml. of 2-methoxyethanol (with decolorizing charcoal treatment), to provide 7.43 gm. of bright orange crystals of 3-(3,4-dimethoxyphenyl)-7-nitro-2H-1,4-benzoxazin-2-one having a melting point of 200–202° C.

*Analysis.*—Calcd. for $C_{16}H_{12}N_2O_6$: C, 58.54; H, 3.68; N, 8.54. Found: C, 58.63; H, 3.73; N, 8.65.

EXAMPLE 4

*3-(3,4-dimethoxyphenyl)-8-chloro-6-nitro-2H-1,4-benzoxazin-2-one*

A mixture of 12.4 gm. (0.06 mole) of 2-amino-6-chloro-4-nitrophenol hydrate and 12 gm. (0.05 mole) of ethyl 3,4-dimethoxyphenylglyoxylate was heated with stirring in an oil bath at 150–165° C. for 2 hours. The mixture was then boiled with 100 ml. of absolute ethanol, cooled and filtered to provide 18.0 gm. of olive colored 3-(3,4-dimethoxyphenyl)-8-chloro-6-nitro-2H-1,4-benzoxazin-2-one having a melting point of 258–260° C. The olive solid was recrystallized from 250 ml. of dimethylformamide to provide 15.9 gm. (83% yield) of yellow brown crystals of 3-(3,4-dimethoxyphenyl)-8-chloro-6-nitro-2H-1,4-benzoxazin-2-one having a melting point of 259–261° C.

*Analysis.*—Calcd. for $C_{16}H_{11}ClN_2O_6$: C, 52.98; H, 3.06; Cl, 9.76; N, 7.72. Found: C, 52.96; H, 3.22; Cl, 9.70; N, 7.55.

What is claimed is:

1. A compound of the formula

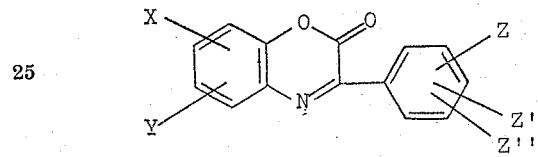

wherein X and Y are members selected from the group consisting of hydrogen, nitro, hydroxy, and halogen; Z is a member selected from the group consisting of lower-alkoxy wherein the alkyl moiety is from 1 to 4 carbon atoms, inclusive; Z′ and Z″ are members selected from the group consisting of hydrogen and lower-alkoxy wherein the alkyl moiety is from 1 to 4 carbon atoms, inclusive.

2. 7,8 - dihydroxy-3 - (3,4 - dimethoxyphenyl)-2H-1,4-benzoxazin-2-one.

3. 3-(3,4-dimethoxyphenyl)-2H-1,4-benzoxazin-2-one.

4. 3-(3,4-dimethoxyphenyl)-7-nitro-2H-1,4-benzoxazin-2-one.

5. 3 - (3,4 - dimethoxyphenyl)-8-chloro-6-nitro-2H-1,4-benzoxazin-2-one.

References Cited by the Examiner

UNITED STATES PATENTS 3,105,071   9/1963   Moffett _____ 260—244

FOREIGN PATENTS 563,113   12/1957   Belgium.

OTHER REFERENCES

Biekert: "Chem. Ber.," vol. 94, pp. 1664–75 (1961).
Butenandt et al.: "Chem. Ber.," vol. 92, pp. 2172–81 (1959).

WALTER A. MODANCE, *Primary Examiner.*

ROBERT T. BOND, *Assistant Examiner.*